Feb. 11, 1964  C. W. COCHRAN  3,120,884
MOLDING FASTENER
Filed Sept. 26, 1960
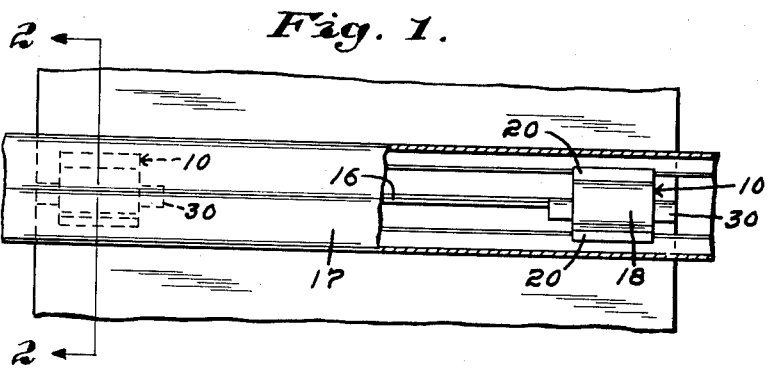
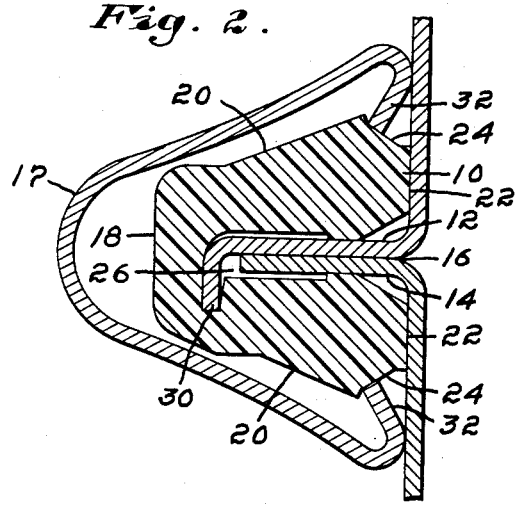
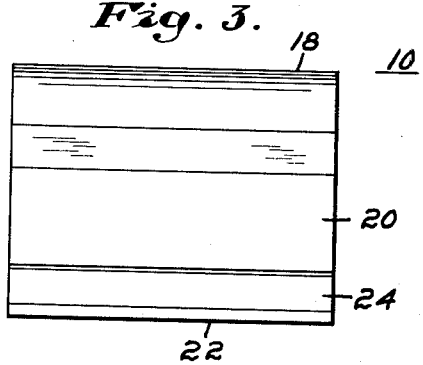
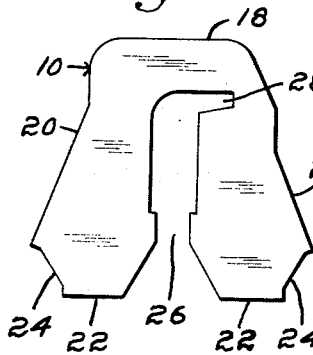
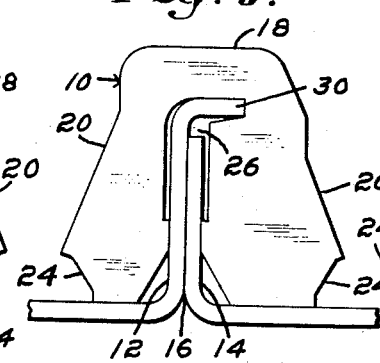
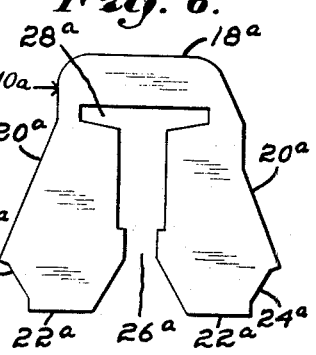
*Inventor:*
Clarence W. Cochran, (deceased)
by Lois Cochran, Administratrix,
by James B. Tiffany Jr.  Atty.

United States Patent Office 3,120,884
Patented Feb. 11, 1964

3,120,884
MOLDING FASTENER
Clarence W. Cochran, deceased, late of Belmont, Mass., by Lois Cochran, administratrix, Belmont, Mass., assignor to United-Carr Fastener Corporation, Cambridge, Mass., a corporation of Delaware
Filed Sept. 26, 1960, Ser. No. 60,247
1 Claim. (Cl. 189—88)

This invention relates generally to fastening devices and specifically to a molding fastener adapted for use with automotive pinch weld constructions.

Recent innovations in automotive body constructions have resulted in the use of pinch welds joining flat surfaces together, particularly at the crown of the fenders. Molding fasteners heretofore known in the industry were primarily used for attachment to flat surfaces. Consequently, fasteners having a depth sufficient to encompass the length of the pinch weld have been designed for use with this type of a body junction.

Therefore, the object of this invention is to provide a molding fastener adapted for use with pinch weld constructions.

Another object of this invention is to provide a molding fastener adapted for simple and easy insertion over the pinch weld and retained in assembly by a snap action of an external trim molding.

A further object of this invention is to provide a molding fastener formed of a plastic or the like material which may be economically extruded or molded.

Other objects of the invention will, in part, be obvious, and will, in part, appear hereinafter.

In the drawing:

FIG. 1 is a top plan view of a pinch weld having the molding and fastener assembled therewith with the trim molding partly broken away;

FIG. 2 is an enlarged view in section taken on the line 2—2 of FIG. 1;

FIG. 3 is a view in side elevation of the fastener;

FIG. 4 is a view of the fastener taken from one end;

FIG. 5 is a view similar to FIG. 4 illustrating the fastener assembled with the pinch weld; and FIG. 6 is a view of a modified form of the fastener.

Referring to the drawings, there is illustrated a molding fastener 10 adaptable for sliding engagement with two portions of the body 12 and 14 joined by a pinch weld 16 and adapted to retain a decorative trim molding 17 having inturned edges at the opposite sides in position thereon. The molding fastener 10 may be formed of any suitable resilient material, but preferably plastic such as nylon, cellulose acetate butyrate resins or other polyamides.

The fastener 10 comprises an A-shaped body having a flat top portion 18 and outwardly and downwardly extending side walls 20 terminating in a divided base 22. The side walls 24 adjacent the base 22 are undercut for a purpose to be described hereinafter. A channel 26 extending upwardly from the base 22 longitudinally extends through the body conforming to the configuration of the upstanding portions 12 and 14 of the automotive portions and having a substantially right angular recess 28 at the top thereof to encompass a bent over flange 30 of one of the body portions 12.

As illustrated in FIG. 2, it will be seen that the fastener may be longitudinally slid into position over the junction of the body portions 12 and 14 with the bent over flange 30 entering into alignment with the right angular recess 28 and a trim molding 17 with the inturned edges 32 snapped into engagement therewith. It will be readily seen that due to the resilient characteristics of the trim molding 17 the inturned edges 32 will exert a certain amount of pressure on the undercut portions 24 preventing lateral or longitudinal motion with respect to the pinch weld 16.

FIG. 6 illustrates a modified form of the fastener 10a having a top portion 18a, outwardly and downwardly diverging portions 20a, undercut portions 24a and base portions 22a. Extending upwardly from the base 22a to the interior of the body of the fastener 10a is a longitudinally extending channel 26a having a T-shaped recess 28a formed at the top, instead of L-shaped as shown in FIG. 2. This modified form is adapted for use with pinch welds having both sides of the body portions extending at right angles to the plane of the weld or for universal use in that it is not necessary to orient the device with the angular flange as it may be slid over the pinch weld from either end.

Since certain other obvious modifications may be made in this device without departing from the scope of the invention, it is intended that all matter contained herein be interpreted in an illustrative and not in a limiting sense.

What is claimed is:

A fastener assembly, comprising in combination, a body portion having two upstanding portions forming a pinch weld portion, a trim molding covering said pinch weld portion and a one-piece molded plastic fastener member attached to the pinch weld portion and holding the trim molding in place on the body portion, at least one of said upstanding body portions having a preformed flange extending at an angle thereto and said fastener member having a longitudinal channel receiving the upstanding portions of the body portion and also having a longitudinal recess extending at an angle from the channel internally of the fastener member and receiving the said angled flange, whereby the fastener member is held in position on said body portion.

References Cited in the file of this patent

UNITED STATES PATENTS

| | | |
|---|---|---|
| 2,359,996 | Kunkel | Oct. 10, 1944 |
| 2,596,780 | Meyers et al. | May 13, 1952 |
| 2,963,133 | MacCallum | Dec. 6, 1960 |
| 3,006,444 | MacCallum | Oct. 31, 1961 |
| 3,037,595 | Meyer | June 5, 1962 |